UNITED STATES PATENT OFFICE.

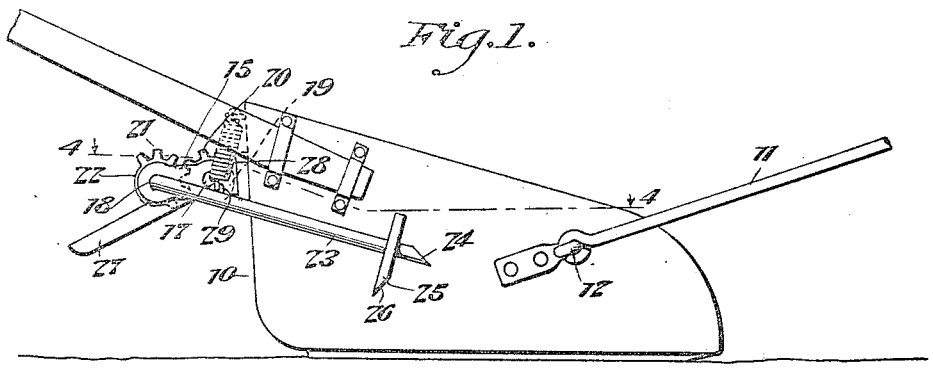
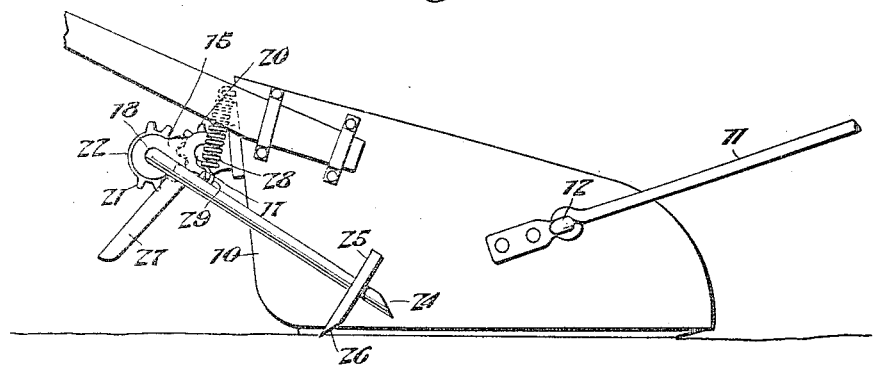

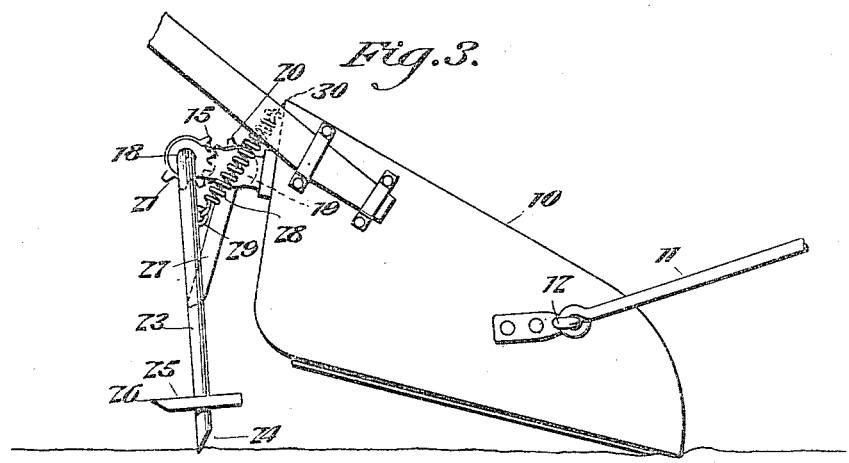
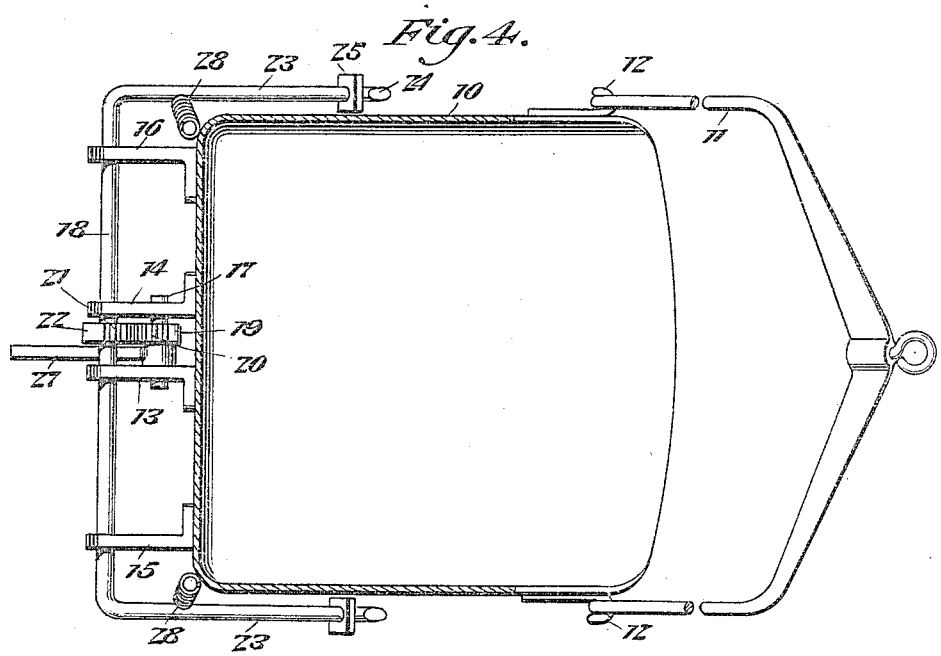

MONTE A. MURRAY, OF REEDPOINT, MONTANA.

SCRAPER-DUMPER.

1,276,559.   Specification of Letters Patent.   Patented Aug. 20, 1918.

Application filed December 14, 1917. Serial No. 207,159.

*To all whom it may concern:*

Be it known that I, MONTE A. MURRAY, a citizen of the United States, residing at Reedpoint, in the county of Stillwater and State of Montana, have invented new and useful Improvements in Scraper-Dumpers, of which the following is a specification.

This invention relates to the ordinary horse drawn scoop shovels, and comprehends the provision of an attachment therefor which will effect a dumping of the shovel when desired.

In carrying out the invention I provide an attachment for the above mentioned purpose, embodying a ground engaging element associated with means which initially engages the ground and serves to limit the degree of penetration of said element into the ground during the dumping operation of the shovel.

Another important object of the invention resides in the fact that the aforementioned means associated with the ground engaging element, is disposed to be initially brought into contact with the ground and serve in the capacity of a fulcrum for the ground engaging element as the latter is brought into an active position to effect a dumping of the shovel.

It is also my purpose to provide an attachment of the character mentioned, which after being brought into contact with the ground by a manually operable lever, effects an automatic dumping operation of the shovel, means being provided to automatically return the component parts of the attachment to normal position, the construction and operation of the attachment being such, that the hands of the operator are free to handle the team.

Other objects of importance will appear as the nature of the invention is better understood from the following detail description, when taken in connection with the accompanying drawings, the invention residing in the construction, combination and arrangement of parts as claimed.

In the drawings forming part of this specification like numerals of reference indicate similar parts in the several views and wherein:—

Figure 1 is a side elevation of a scoop shovel and the attachment, showing the inoperative position of the latter.

Fig. 2 is a similar view showing the initial position of the attachment at the commencement of the operation of dumping the shovel.

Fig. 3 is a side elevation showing the rear end of the shovel completely elevated by the attachment, the nose of the shovel about ready to act as a fulcrum for the complete turning over of the same.

Fig. 4 is a sectional view through lines 4—4 of Fig. 1.

Referring to the drawings in detail 10 indicates the scoop shovel provided with the ordinary horse attaching bail 11 connected to the trunnions 12.

Projecting from the rear wall of the scoop is a plurality of rearwardly extending spaced parallel arms 13, 14, 15 and 16. A shaft 17 is journaled in the arms 13 and 14 and in advance of a shaft 18 which is journaled in the arms 13, 14, 15 and 16. A pinion 19 is keyed to the shaft 17, the pinion having teeth 20 extending partially around the same, and meshing with the teeth 21 of a similar pinion 22 keyed to the shaft 18. Secured to the opposite ends of the shaft 18 are forwardly extending ground engaging elements 23 having their free extremities beveled as at 24 to present sharpened edges. Shields 25 are carried by the ground engaging elements 23 at a point adjacent their beveled extremities and are so disposed to be brought into contact with the ground prior to the ground engaging elements 23. The shields 25 are beveled as at 26 to present sharpened edges, and thus obtain an effective purchase upon the ground, to permit these members to serve in the capacity of fulcrums for the ground engaging elements 23 as the latter assume their active position. A manually operable rearwardly and downwardly extending lever 27 is keyed to the shaft 17, and is positioned to be depressed by the foot of the operator when use of the attachment is desired for the purpose intended. Coil springs 28 have their corresponding ends secured in any suitable manner as at 29 to the ground engaging elements, while the opposite ends of the springs are secured to the rear wall of the shovel as at 30, the springs being provided to maintain the lever 27 normally in the position shown in Fig. 1, and to automatically return the ground engaging elements to their normal position subsequent to the dumping of the shovel. As disclosed by the drawings the shaft 18 and the ground engaging elements 23 are integral, comprising a substantially U-shaped element.

The operation briefly stated is as follows: When it is desired to dump the shovel, the lever 27 is depressed by the foot of the operator, thus bringing the beveled edges 26 of the shields 25 into contact with the ground, the initial utility of the members 25 being to fulcrum the ground engaging elements 23. It is of course to be understood that the team continues to move in a forward direction, and with the members 25 in contact with the ground, the ground engaging elements move about said members as a fulcrum, until the beveled extremities 24 engage the ground, subsequent to which the ground engaging elements continue to assume their vertical active position. As the ground engaging elements assume this position, the rear end of the shovel is elevated until the shovel assumes the desired angularity with respect to the ground, to insure a complete turning over of the shovel. The nose or forward edge of the shovel remains in contact with the ground, and serves as a fulcrum about which the shovel moves as it is being dumped. Subsequent to the dumping of the shovel the springs 28 function to return the ground engaging elements to normal position.

While it is believed that from the foregoing description the nature and advantages of the invention will be readily apparent, I desire to have it understood that what is herein shown and described is merely illustrative of the preferred embodiment of the invention, and that such changes may be resorted to when desired as fall within the scope of what is claimed.

What is claimed is:—

1. The combination with a shovel adapted to be moved over the surface, of bearings projecting from the shovel, shafts journaled in said bearings, ground engaging elements carried by one of said shafts, pinions carried by the respective shafts and in meshing engagement, and a lever for rotating said shafts through said pinion, whereby said elements are moved to an active position to elevate the rear end of the shovel.

2. The combination with a shovel adapted to be moved over a surface, of shafts journaled in bearings on said shovel, ground engaging elements on one of said shafts, a shield on each of said elements, means connected between said elements and shovel for turning the shaft and retaining said elements normally out of ground engaging position, co-engaging means between the referred to shaft and the remaining shaft in the bearings, and operating means for such co-engaging means whereby to turn both of said shafts and to bring the ground engaging element into ground engaging position.

3. The combination with a shovel adapted to be moved over a surface, of bearings projecting from the shovel, a short shaft and longer shaft journaled in bearings, ground engaging elements on the ends of the longer shaft, shields on said elements, each of said shields having a sharpened edge at the ground engaging end thereof, and each of said ground engaging elements having its outer end sharpened, a pinion on the longer shaft, a co-engaging pinion on the other shaft, an operating handle for the short shaft, and spring members connected to the shovel and to the ground engaging elements whereby to normally retain the latter out of ground engaging position.

4. The combination with a shovel adapted to be moved over a surface, of a shaft journaled in bearings on the rear of the shovel, said shaft having its ends provided with angular extensions forming straight parallel ground engaging elements, the outer ends of which being beveled, shields on said elements, means for automatically retaining said elements above the bottom of the shovel and out of ground engaging position, and means comprising mechanism surrounding a lever arranged on the back of the shovel and co-engaging with the shaft for actuating said shaft to bring the ground engaging elements to ground engaging position.

In testimony whereof I affix my signature.

MONTE A. MURRAY.

Copies of this patent may be obtained for five cents each, by addressing the "Commissioner of Patents, Washington, D. C."